UNITED STATES PATENT OFFICE.

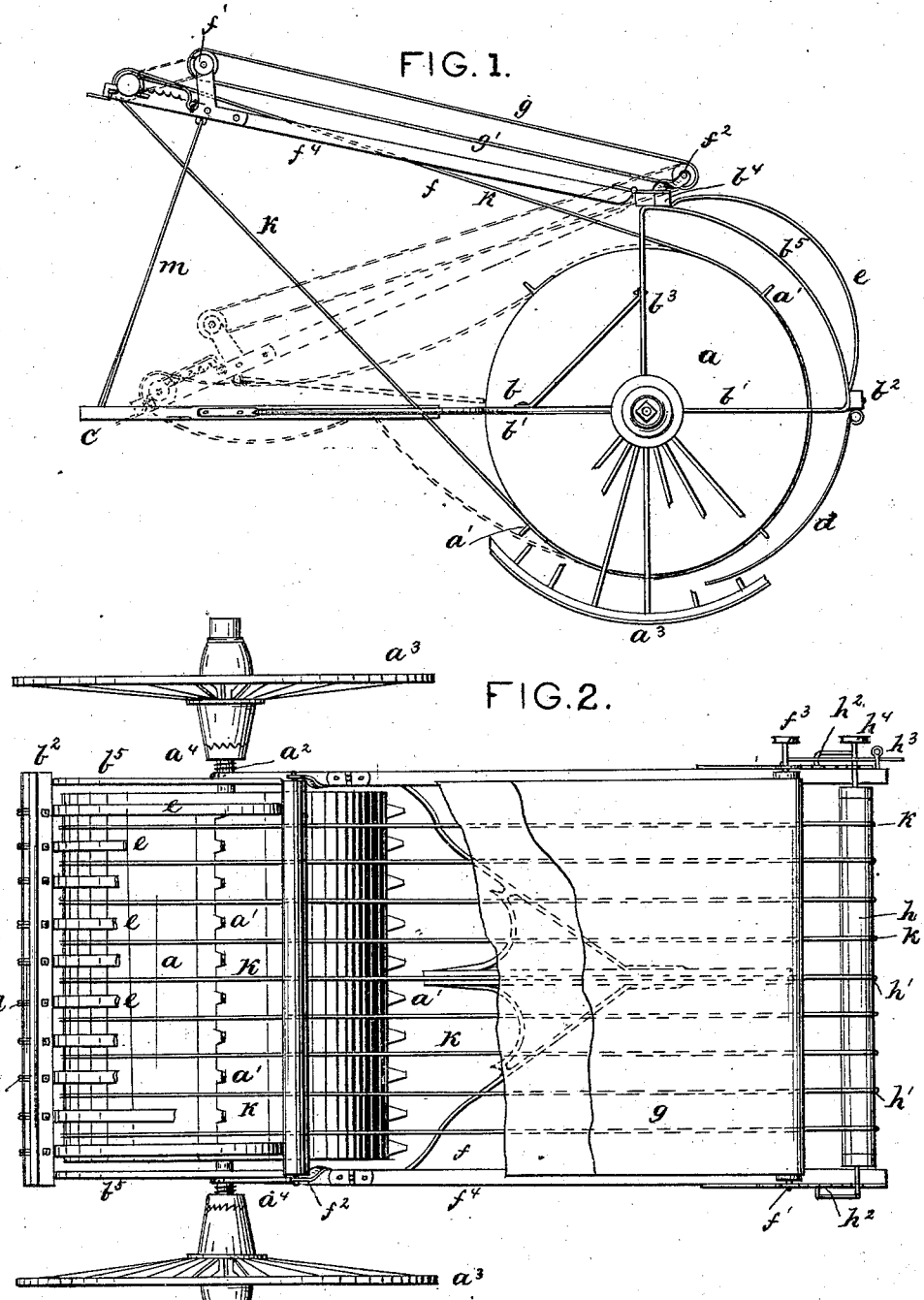

NICHOLAS FLEEK, OF GOLDFIELD, AND OSCAR R. WILLIAMS, OF FORT DODGE, IOWA.

HAY-LOADER.

SPECIFICATION forming part of Letters Patent No. 232,397, dated September 21, 1880.

Application filed May 31, 1880. (No model.)

*To all whom it may concern:*

Be it known that we, NICHOLAS FLEEK, of Goldfield, Wright county, Iowa, and OSCAR R. WILLIAMS, of Fort Dodge, Webster county, Iowa, citizens of the United States, resident at Goldfield and Fort Dodge, in the counties of Webster and Wright and State of Iowa, have invented certain new and useful Improvements in Hay-Loaders; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has for its object to provide a hay-loader which shall be free from many of the objections which obtain in machines of this class of ordinary construction.

It consists in improvements hereinafter described, and pointed out in the claims.

In the drawings, Figure 1 is a side elevation, and Fig. 2 is a plan, of a machine having our improvements attached thereto.

$a$ is the drum, provided with the series of teeth $a'$, arranged in longitudinal rows, the rows being parallel, as shown. The drum is mounted on an axle, $a^2$, supported by the wheels $a^3$, and its diameter is sufficient to bring the points of the teeth $a'$ nearly to the ground. Suitable clutch-couplings, $a^4$, are provided, by which the drum may be put in or out of gear.

Mounted on the axle is a frame, $b$, the horizontal bars $b'$ of which are extended forward and are bent inward in front of the drum, and have the tongue $c$ held between their ends, as shown.

On the rear ends of the bars $b'$ there is fixed the cross-bar $b^2$, to which are fixed the spring rake-teeth $d$. The teeth $d$ curve downward and under the drum, and are arranged and adapted to gather the hay from the ground. The hay, after being picked up by the teeth $d$, is again caught and carried upward by the teeth $a'$ on the drum $a$.

On the upper end of vertical side bars, $b^3$, of the frame $b$ is placed the top cross-bar, $b^4$, which is braced to the rear cross-bar, $b^2$, by the curved rods $b^5$.

$e$ are a series of curved guards fastened to the top cross-bar, $b^4$, and the rear cross-bar, $b^2$. They prevent the hay falling off the drum over the bar $b^2$ and hold it to the drum, so that it is carried upward until it is taken off by the carrier-cords, which convey it to the load.

$f$ is an adjustable carrier-frame. Its rear end is hinged to the top bar, $b^4$, of frame $b$, so that its forward end can be raised or lowered at pleasure.

Near and a little above the forward end of frame $f$ is mounted a roller, $f'$, over which is put an endless apron, $g$. The other end of the endless apron passes around a roller, $f^2$, mounted on the top cross-bar, $b^4$, of frame $b$. One end of the axle of the roller $f'$ is provided with a pulley, $f^3$.

$h$ is a roller provided with a series of circumferential channels, $h'$, corresponding in number with the number of teeth $a'$ on the drum $a$. The channels $h'$ are formed to have alternate positions with the teeth, so that the carrier cords or bands $k$, when put in the channels, will pass around the drum between the teeth. The roller $h$ is held on one of a series of bearings, $h^2$, provided on the upper side of the side bars, $f^3$, of the frame $f$, by any suitable retaining device, $h^3$. This series of bearings affords facilities for setting the roller $h$ outward or inward, as it may be desired to tighten or slacken the carrier-bands $k$.

The end of the axle of the roller $h$ is provided with a pulley, $h^4$, over which and over the pulley $f^3$ is put a band, by which motion is imparted to the endless apron $g$.

On the under side, and near the forward end of the frame $f$, is hinged a brace, $m$. By this brace the end of the frame may be raised and set in position to tighten the bands $k$. By releasing the lower end of the brace it may be turned under the frame, so that the latter can be let down, as shown in dotted lines, Fig. 1. The lower end of the brace $m$ sets in a notch in the top of the tongue $c$, and is prevented from getting out of place when it is holding the hinged frame $f$ elevated.

We employ for the elevating-carrier a series of bands or cords, $k$, in preference to the ordinary endless apron. By these separate cords we can better regulate the tautness, and it is much easier to mend any breaks or other irregularities which may occur, while at the same time the results in carrying the hay upward are equal to that of any other carrier.

The endless apron $g$ is made to revolve, so that its under portion $g'$ moves upward in the same direction and parallel with the bands $k$. This is effected by a proper adjustment of the driving-band, which is put over the pulleys $f^3$ and $h^4$. The endless apron prevents the wind from blowing the hay off the bands $k$, and at the same time, by its parallel motion, greatly aids in the elevation and discharge of the hay onto the load.

When the machine is not in use the elevator-frame $f$ is let down, as indicated in Fig. 1, thus reducing its relative size, so that it can be readily stored in any ordinary farm tool or implement house.

The bands $k$ are readily looped up out of the way when the carrier-frame is let down.

Having thus described our invention, what we claim, and desire to obtain by Letters Patent, is—

1. In a hay-loader, these elements in combination: the frame $b$, the drum $a$, furnished with the series of rows of longitudinal teeth $a'$, the rake-teeth $d$, the guards $e$, the hinged frame $f$, provided with roller $h$ in its outer end, and the series of independent elevating-cords $k$, all arranged to operate substantially as set forth.

2. In a hay-loader, the combination, with the frame $b$, drum $a$, and elevating means, $k$, of the hinged frame $f$, apron $g$, and hinged brace $m$, substantially as set forth.

In testimony that we claim the foregoing we have hereunto set our hands and seals this 3d day of May, 1880.

NICHOLAS FLEEK. [L. S.]
OSCAR R. WILLIAMS. [L. S.]

Witnesses:
CHRIST. SCHRÖDEN,
R. B. PAGE.